2,941,862

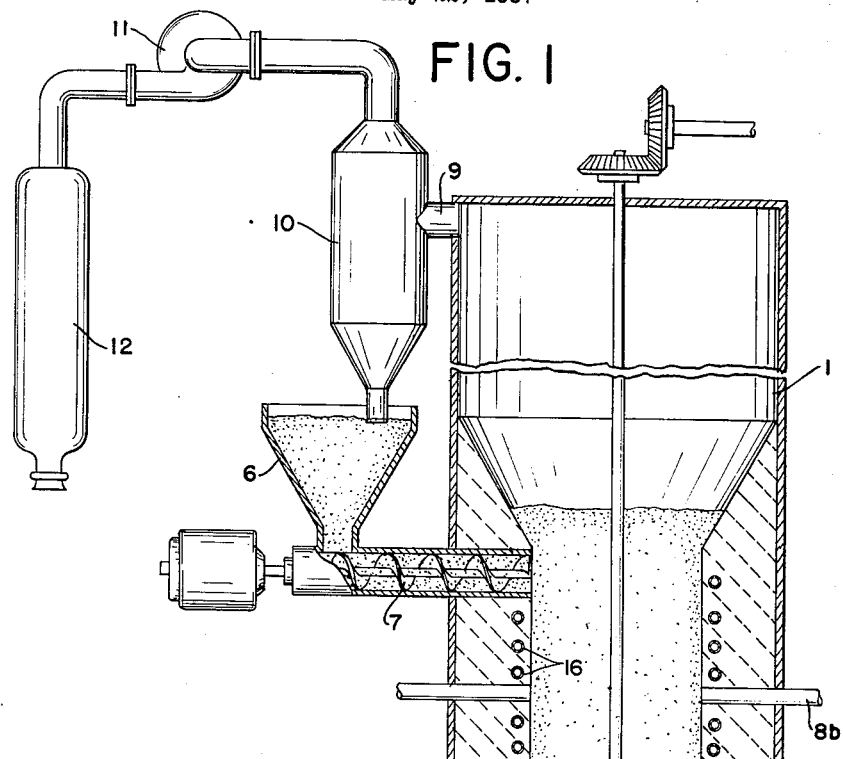
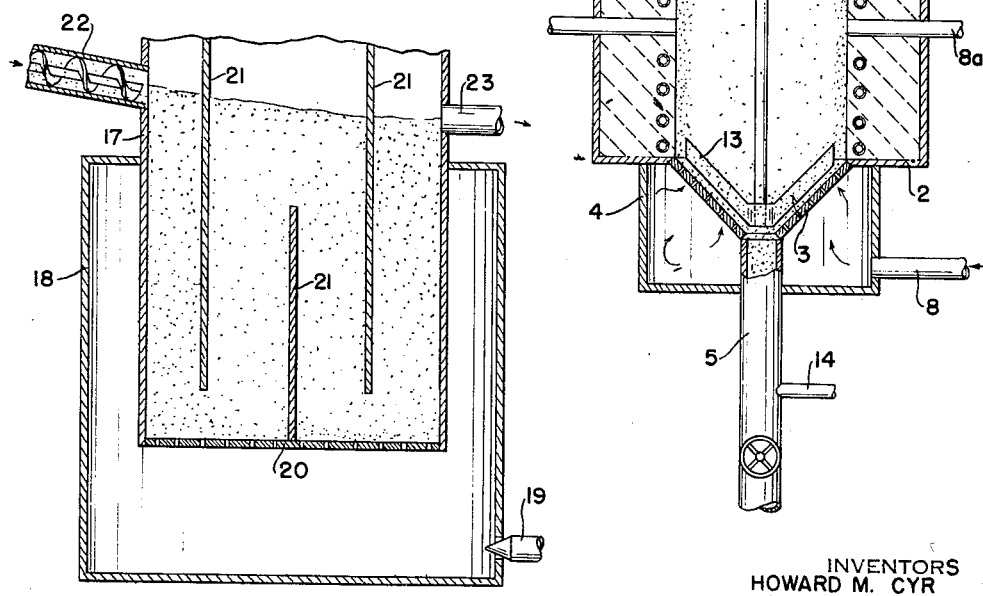
FIG. 1
FIG. 2
INVENTORS
HOWARD M. CYR
BRADFORD C. HAPFORD
BY
Pennie, Edmonds, Morton, Barrows & Taylor
ATTORNEYS

# United States Patent Office 2,941,862
Patented June 21, 1960

TREATMENT OF ZINC OXIDE

Howard M. Cyr and Bradford C Hafford, Palmerton, Pa., assignors to The New Jersey Zinc Company, New York, N.Y., a corporation of New Jersey Filed May 22, 1957, Ser. No. 660,961

4 Claims. (Cl. 23—148)

This invention relates to the treatment of zinc oxide and, more particularly, to the treatment of American process zinc oxide to decrease its acidity.

American process zinc oxide is produced by burning in air the zinc vapor evolved from a smelting operation in which a zinc ore is reduced with carbon. The source of carbon is generally coal, and both the coal and the zinc ore contain significant quantities of sulfur. As a result, the zinc vapor evolved from the smelting operation is accompanied by sulfurous gases such as sulfur dioxide and sulfur trioxide. When the zinc vapor is burned in air to convert it to extremely fine particles of zinc oxide, some of these particles combine with the gases to form zinc sulfite or zinc sulfate, or both, and others of the particles adsorb the sulfurous gases. Whether combined with or adsorbed by the zinc oxide, most of these sulfurous compounds impart acidity to the zinc oxide. This acidity can be readily measured by titrating an aqueous suspension of the oxide with an alkaline solution. The degree of acidity thus measured has been established by rubber technicians as a true indicator of the curing rate of rubber containing the acidic zinc oxide, the lower this acidity the more rapid the cure rate as a result of a greater effectiveness of certain accelerators used to promote curing of the rubber. Zinc oxide acidities of 0.04% and lower (calculated as $SO_3$) do not appreciably retard the cure rate of conventional rubber accelerators.

Many procedures have been proposed heretofore for decreasing the acidity of American process zinc oxide. Many of these procedures have involved treatment of the zinc oxide with heated gases, and contact between the oxide and gas has been promoted by such expedients as a rotary kiln, a screw conveyor, and vertical and inclined tubes through which the zinc oxide falls. All of these expedients have been found to be only partially effective at moderate temperatures; at the more elevated temperatures required by their prior art methods to produce acceptable decrease in acidity, the particles of zinc oxide have grown so much larger as to destroy theiry utility as rubber additives.

We have now discovered that the acidity of American process zinc oxide can be substantially decreased without the aforementioned prohibitively excessive growth of particle size by maintaining the solid oxide particles in a fluidized state for an effective period of time at an elevated temperature of about 350° to 800° C. The method of our invention comprises establishing a bed of zinc oxide particles in a treating vessel and effecting fluidization of the bed of zinc oxide by passing a gas upwardly therethrough, the temperature of the fludiized bed being maintained within the range of 350° to 800° C. The fluidization of the zinc oxide under these conditions progressively decreases with time the acidity of the zinc oxide, and therefore the duration of the treatment need be only that required at a specific treating temperature to attain the desired ultimate low degree of acidity.

Our heating of zinc oxide in a fluid bed, agitated by the fluidizing gases, has unique advantages over other methods of heating. That is, when the fluidizing gases are hot as they enter the bed, they transfer heat directly to the zinc oxide particles, without transfer through or from heated walls or through intervening layers of zinc oxide. On the other hand, when the heating is effected predominantly through the walls of the treating vessel, the transfer of heat is not only highly efficient but the constant, vigorous motion of the oxide particles creates nearly perfect temperature uniformity, preventing both over and under heating. By avoiding overheating, particle growth is minified.

The method of our invention is applicable to any physical form of American process zinc oxide. For example, we have used our method to effectively decrease the acidity of fresh unpacked oxide as well as of packed oxide (i.e. oxide that had been densified by packing in bags), and the process has been found to be similarly effective in the treatment of pelleted as well as flaked zinc oxide. The only difference in treating these various forms of zinc oxide in practicing our invention is the velocity of the fluidizing gas required to maintain satisfactory fluid bed conditions.

The velocity of the fluidizing gas required for treatment of the aforementioned various physical forms of zinc oxide generally ranges between 2 and 8 feet per minute calculated at room temperature and pressure. Gas velocities at the lower end of this range are most practical for unpacked oxide because they minify dust loss, somewhat higher velocities are suitable for packed oxide, and the upper end of this velocity range is useful in treating pelleted oxide. These useful velocities are not appreciably changed by a change in the composition of the fluidizing gas.

The fluidizing gases useful in practicing our invention include neutral gases (that is, gases inert with respect to zinc oxide and its combined and adsorbed acidic sulfur compounds) as well as reducing and oxidizing gases. For example, completely inert gases such as steam and nitrogen are effective for a reason common to all of the aforementioned fluidizing gases, that is they sweep away adsorbed sulfur dioxide and sulfur trioxide which are liberated from the zinc oxide at the treating temperature and they accomplish this without significant grain growth of the resulting zinc oxide particles thus freed of their excessive acidity. The elevated treating temperature also promotes thermal decomposition of any zinc sulfite present in the zinc oxide, and the sulfur dioxide formed by this decomposition is carried away by the fluidizing gas. Within the range of 700° to 800° C., any zinc sulfate present is decomposed to sulfur trioxide which is similarly swept away.

Reducing gases such as carbon monoxide and hydrogen are particularly effective in practicing our invention. In fact, they are so effective that it is generally sufficient that they constitute only 5% to 10% of the fluidizing gas, the balance being any available inert gas. The products of combustion of solid, liquid and gaseous fuels, burned with a deficiency of air, also constitute satisfactory reducing gases for our fluidizing operation. These reducing gases are particularly effective in decreasing the acidity of American process zinc oxide because, in addition to the aforementioned scrubbing effect of these gases in the fluidized oxide bed, they have a beneficial chemical action on the acidic components of the zinc oxide. That is, at temperatures of 350° C. to 800° C. these gases reduce the oxidized sulfur compounds, such as sulfites and sulfates, to the corresponding sulfides which are not acidic. Any hydrogen sulfide or carbonyl sulfide formed by the reducing gas treatment is swept away by the fluidizing gases, thus contributing toward lower acidity. The further presence of steam in the reducing gas is beneficial in facilitating the conversion of acidic compounds, such as zinc sulfate, to nonacidic compounds, such as basic zinc sulfate.

The formation of a sulfide as the result of the fluidizing treatment of American process zinc oxide with a reducing gas generally does not adversely affect the quality or utility of the resulting zinc oxide product. That is, during the conversion of acidic sulfur-containing compounds to sulfides, a major portion of the sulfur is removed with the effluent gases so that the total sulfur content of the resulting sulfide-containing zinc oxide is substantially less than its initial total sulfur content. However, when the zinc oxide contains a significant amount of lead, the presence of the resulting black lead sulfide impairs the whiteness of the treated zinc oxide. If this color degradation is objectionable, it can be avoided by the use of steam along with the reducing gas in the fluidizing treatment. Thus, we have found that by using a reducing gas humidified with about 5% to 50% by volume of steam as the fluidizing gas for the practice of our invention, the final color of the resulting lead oxide-containing zinc oxide is wholly satisfactory for pigment purposes.

It is also advantageous that oxides, which have been lowered in acidity by conversion of sulfur compounds to sulfides, be cooled in such a way as to prevent reformation of the acidic compounds. This can be done by either cooling to about 200° C. in a nonoxidizing gas or by suddenly quenching in air.

The effectiveness of the fluidizing treatment of our invention is a function of the duration and of the temperature of the treatment. For example, at any treating temperature within the range of 350° to 800° C., the acidity of American process zinc oxide is progressively diminished by an increase in length of the treating period up to the point where the acidity is reduced to about 0.005%. Beyond this point, regardless of how short the heating period required to attain it, further heating has no significant further effects on the degree of acidity of the zinc oxide. On the other hand, for a treating period of any specific duration, say for one hour, the acidity is progressively lowered by increasing temperatures with the aforementioned range. We have found that in spite of the separation of particles of the zinc oxide by the fluidizing gases, there is a tendency for the particles to grow when the treating temperature is in the upper portion of the effertive temperature range. Thus, we have found that at temperatures within the range of 400° to 600° C., an effective decrease of the oxide's acidity is achieved in reasonable treating periods without significant increase in particle size of the oxide during the fluidization treatment. Temperatures within the range of 600° to 800° C. are suitable where the particular effectiveness of the fluidizing gas, such as a reducing gas, makes possible a relatively short retention period or where a slight increase in particle size does not impair the utility of the treated zinc oxide for its intended use.

The apparatus useful in practicing the method of our invention includes all forms which are conventionally used for other fluidization treatments. Representative apparatus are shown in the accompanying drawing in which:

Fig. 1 is a front elevation partly in section of a treating vessel used in practicing the invention; and Fig. 2 is a partial front section of another type of treating vessel useful in practicing our invention.

As shown in Fig. 1, a cylindrical vessel 1 is mounted vertically. The closed bottom 2 of the vessel is provided with a conically-shaped grate 3 enclosed in a blow box 4. The lower end of the conical grate communicates with a valved discharge line 5 for continuously or intermittently discharging the treated oxide. The upper portion of the vessel is provided with a charging hopper 6 having a screw feed 7 for delivery of the American process zinc oxide into the upper portion of the vessel but advantageously below the surface of the column of zinc oxide therein. The heated fluidizing gas is admitted through an inlet line 8 into the blow box and thence through the grate 3. Exit gases are withdrawn from a discharge line 9 at the top of the vessel and pass through a cyclone 10. The oxide dust separated by the cyclone is discharged into the charging hopper 6 and the gas discharged from the cyclone is forced by a fan 11 into and through a collection bag 12. We have found it helpful in preventing channeling in a charge of fresh fluffy zinc oxide to mechanically agitate the mass of zinc oxide in the vessel with a stirrer 13, to intermittently interrupt the flow of fluidizing gas into and through the mass of oxide, or to introduce the heated fluidizing gas through several additional vertically-spaced inlets 8a and 8b as well as by a combination of these expedients. A small additional amount of fluidizing gas was supplied by gas such as steam, an inert gas or cooled exhaust gases from the bag collector 12 admitted through an inlet 14 in the product discharge line 5 for the purpose of maintaining the fluidity of the product in this line and also for cooling the oxide before it is exposed to the air. In order to maintain the desired temperature within the mass of zinc oxide heated by the fluidizing gas, we have found it advantageous to counteract radiation losses, and even supplement the heating supplied by the hot fluidizing gas, by providing the interior of the vessel with an insulating liner 15 carrying heating coils 16.

In the apparatus shown in Fig. 2, a treating vessel 17 is largely encased in a combustion chamber 18 provided with a burner 19 using either gas or oil as a fuel. The hot combustion gases fill the interior of the combustion chamber where they supply heat to the sides of the treating vessel 17 and also pass upwardly through the perforated bottom 20 of the treating vessel where they serve as the fluidizing medium for the zinc oxide charge. The treating vessel is advantageously provided with staggered baffles 21 which insure a long path of travel for the zinc oxide entering the vessel through a screw feed 22 and leaving the vessel through an oppositely positioned discharge outlet 23.

The following specific examples are illustrative of the practice of our invention:

*Example 1*

Fine unpacked American process zinc oxide having an average particle size of 0.26 micron and an acidity of 0.24% (measured as $SO_3$) was charged to a treating vessel such as that shown in the drawing. A heated gaseous mixture of hydrogen, nitrogen and steam in a volume ratio of 5:95:20 was passed through the bed of zinc oxide in the vessel at an upward veocity of about 3 feet per minute so as to maintain the bed in a fluidized condition for a period of one hour at each of several different temperatures. The pertinent data for these different temperature runs are as follows:

| Temperature, ° C. | Acidity, Percent as $SO_3$ | Particle Size, Micron |
|---|---|---|
| Untreated | 0.24 | 0.26 |
| 300 | 0.19 | 0.26 |
| 400 | 0.045 | 0.27 |
| 500 | 0.010 | 0.28 |
| 600 | 0.005 | 0.30 |
| 700 | 0.005 | 0.41 |
| 800 | 0.005 | 0.62 |

Example II

The same American process zinc oxide was fluidized in the same apparatus under the same conditions except for the use of air instead of the hydrogen-nitrogen mixture as the fluidizing gas. The operating data for these different temperature runs are as follows:

| Temperature, °C. | Acidity, Percent as $SO_3$ | Particle Size, Micron |
|---|---|---|
| Untreated | 0.24 | 0.26 |
| 300 | 0.18 | 0.26 |
| 400 | 0.16 | 0.26 |
| 500 | 0.14 | 0.26 |
| 600 | 0.13 | 0.29 |
| 700 | 0.05 | 0.36 |
| 800 | 0.03 | 0.45 |

Example III

The treatment described in Example I was duplicated with the single exception that no steam was used in the fluidizing gas stream. That is, the fluidizing gas consisted of 5% hydrogen and 95% nitrogen. The results of these operations, as they varied with the treating temperature are given in the following table:

| Temperature, °C. | Acidity, Percent as $SO_3$ | Particle Size, Micron |
|---|---|---|
| Untreated | 0.24 | 0.26 |
| 300 | 0.23 | 0.27 |
| 400 | 0.07 | 0.27 |
| 500 | 0.05 | 0.28 |
| 600 | 0.02 | 0.31 |
| 700 | 0.005 | 0.49 |
| 800 | 0.005 | 0.73 |

Example IV

The treatment described in Example II was duplicated with the single difference that no steam was added to the fluidizing air. The effects of different operating temperatures on the acidity and particle size of the zinc oxide are shown by the following summary:

| Temperature, °C. | Acidity, Percent as $SO_3$ | Particle Size, Micron |
|---|---|---|
| Untreated | 0.24 | 0.26 |
| 300 | 0.22 | 0.26 |
| 400 | 0.19 | 0.26 |
| 500 | 0.17 | 0.27 |
| 600 | 0.14 | 0.29 |
| 700 | 0.04 | 0.41 |
| 800 | 0.03 | 0.57 |

Although each of the foregoing examples has involved only a single-stage treatment of the zinc oxide by the method of our invention, we have found that repeated treatments, either identical or different from one another, have the effect of further decreasing the acidity of the oxide beyond that level attainable with a single treatment. This is shown in the following example:

Example V

The aforementioned American process zinc oxide was fluidized in two successive 10-minute treatments, the two treatments of each series being conducted at the same temperature but the series being carried out at different temperatures. The first treatment of each series used the same fluidizing gas mixture as in Example I ($H_2:N_2:H_2O$) and the second treatment of each series used a fluidizing gas mixture as in Example II (airstream). The pertinent operating data and results are as follows:

| Temperature, °C. | Acidity, Percent as $SO_3$ | Particle Size, Micron |
|---|---|---|
| 500 | 0.04 | 0.26 |
| 550 | 0.03 | 0.27 |
| 600 | 0.02 | 0.28 |

We claim:

1. The method of decreasing the acidity of American process zinc oxide to at least 0.04% (calculated as $SO_3$) without significant growth of its particle size which comprises establishing a vertically-disposed bed of the zinc oxide particles in a treating vessel, effecting fluidization of the bed of zinc oxide by passing a reducing gas upwardly therethrough at a velocity of about 2 to 8 feet per minute (calculated at room temperature and pressure) for an effective period of time to decrease the acidity of the zinc oxide to the aforementioned value, and maintaining the fluidized bed at a temperature within the range of about 400° to 600° C.

2. The method of decreasing the acidity of American process zinc oxide to at least 0.04% (calculated as $SO_3$) without significant growth of its particle size which comprises establishing a vertically-disposed bed of the zinc oxide particles in a treating vessel, effecting fluidization of the bed of zinc oxide by passing upwardly therethrough at a velocity of about 2 to 8 feet per minute (calculated at room temperature and pressure) a reducing gas humidified with 5% to 50% by volume of steam for an effective period of time to decrease the acidity of the zinc oxide to the aforementioned value, and maintaining the fluidized bed at a temperature within the range of about 400° to 600° C.

3. The method of decreasing the acidity of American process zinc oxide to at least 0.04% (calculated as $SO_3$) without significant growth of its particle size which comprises establishing a vertically-disposed bed of the zinc oxide particles in a treating vessel, effecting fluidization of the bed of zinc oxide by passing a reducing gas upwardly therethrough at a velocity of about 2 to 8 feet per minute (calculated at room temperature and pressure) for an effective period of time to decrease the acidity of the zinc oxide to the aforementioned value, maintaining the fluidized bed at a temperature within the range of about 400° to 600° C., and effecting mechanical stirring of the fluidized bed.

4. The method of decreasing the acidity of American process zinc oxide to at least 0.04% (calculated as $SO_3$) without significant growth of its particle size which comprises establishing a vertically-disposed bed of the zinc oxide particles in a treating vessel, effecting fluidization of the bed of zinc oxide by passing a reducing gas upwardly therethrough at a velocity of about 2 to 8 feet per minute (calculated at room temperature and pressure) for an effective period of time to decrease the acidity of the zinc oxide to the aforementioned value, maintaining the fluidized bed at a temperature within the range of about 400° to 600° C., thereafter effecting fluidization of the bed of zinc oxide with a mixture of air and 5% to 50% by volume of steam by passing said mixture upwardly through the bed, and maintaining the bed fluidized with the air-steam mixture at a temperature within the range of about 400° to 600° C.

References Cited in the file of this patent

UNITED STATES PATENTS

| | | |
|---|---|---|
| 406,868 | Bartlett | July 16, 1889 |
| 1,664,767 | Breyer et al. | Apr. 3, 1928 |
| 2,416,044 | Calbeck | Feb. 18, 1947 |
| 2,485,604 | Kalbach | Oct. 25, 1949 |
| 2,747,966 | Calbeck | May 29, 1956 |

UNITED STATES PATENT OFFICE

CERTIFICATE OF CORRECTION

Patent No. 2,941,862                                June 21, 1960

Howard M. Cyr et al.

It is hereby certified that error appears in the printed specification of the above numbered patent requiring correction and that the said Letters Patent should read as corrected below.

Column 1, line 54, for "theiry" read -- their --; line 65, for "fludiized" read -- fluidized --; column 3, line 54, for "effertive" read -- effective --; column 5, penultimate line, for "(airstream)" read -- (air:steam) --.

Signed and sealed this 15th day of November 1960.

(SEAL)
Attest:

KARL H. AXLINE
Attesting Officer

ROBERT C. WATSON
Commissioner of Patents